United States Patent [19]
Kuhlman

[11] 3,738,399
[45] June 12, 1973

[54] FLOW NOZZLE AND VALVE

[75] Inventor: Lorraine O. Kuhlman, Monroe City, Mo.

[73] Assignee: Laco Manufacturing Company, North Kansas City, Mo.

[22] Filed: June 21, 1971

[21] Appl. No.: 154,804

[52] U.S. Cl. .................... 141/215, 137/386, 251/73
[51] Int. Cl. .......................... B65b 57/00, B67c 3/00
[58] Field of Search .................. 137/386; 141/198, 141/209–211, 214, 215, 217, 225; 222/568; 251/73

[56] References Cited
UNITED STATES PATENTS

| | | | |
|---|---|---|---|
| 2,363,123 | 11/1944 | Franck | 137/386 X |
| 2,786,493 | 3/1957 | Pacey | 137/386 X |
| 762,817 | 6/1904 | Fusner | 222/568 |
| 2,792,975 | 5/1957 | Yorker | 222/568 X |
| 2,106,197 | 1/1938 | Wildebour | 141/215 |
| 2,504,450 | 4/1950 | Rhodes | 251/73 X |

Primary Examiner—Houston S. Bell, Jr.
Attorney—Claude A. Fishburn, Orville O. Gold and Malcom A. Litman

[57] ABSTRACT

A flow nozzle and valve for use with a flow member connected to a pump operative to selectively move fluid through the flow member and into the flow nozzle includes a tubular body member having an inlet end portion and a discharge end and a wall defining a flow passage tapering from the inlet end to a dam forming a reduced flow area and having an upper surface or crest extending transversely across the flow passage. A valve member is positioned between the dam and the discharge end and movable between an open flow permitting position during operation of the pump and a flow interrupting position substantially restricting flow through the flow passage upon filling of a container having the flow nozzle therein.

3 Claims, 6 Drawing Figures

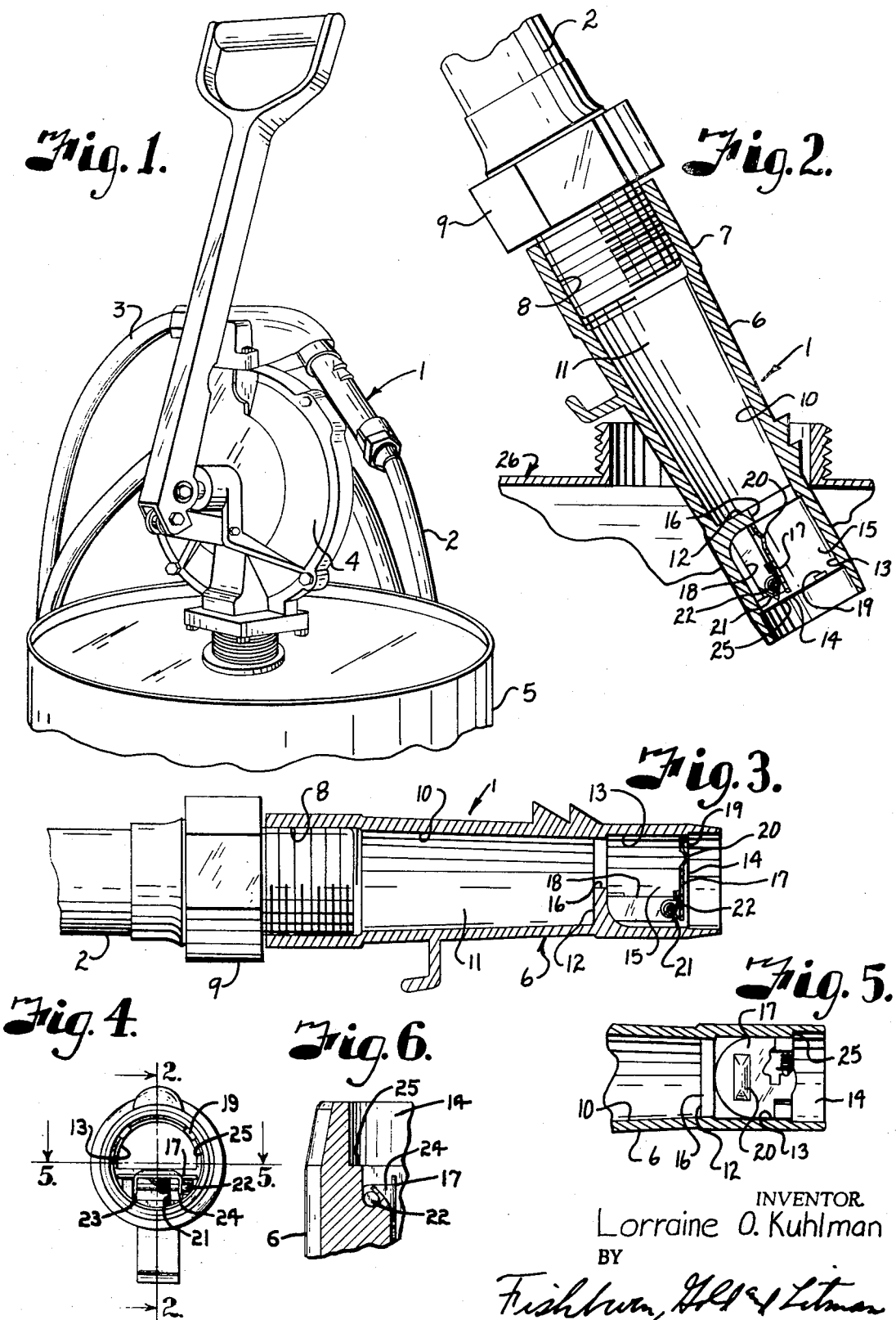

FLOW NOZZLE AND VALVE

The present invention relates to hose nozzles and more particularly to a nozzle having an automatic shut-off valve therein and movable to a flow interrupting or restricting position upon filling of a container having the flow nozzle therein.

Heretofore, manually operated pumps for gasoline and like liquids, particularly on farms and the like, have been used on drums and tanks to pump the contents into vehicles or equipment using same. The pumps have the discharge provided with a hose and nozzle on the discharge end of the hose. In order to provide a partial restriction to liquid flow to indicate to an operator of the pump that the container receiving the liquid is almost full to thereby prevent overflow, the nozzles have had automatic valve assemblies mounted on nozzle bodies, but such structures have a number of parts and require labor for machining and assembly with resulting high cost.

The principal objects of the present invention are: to provide a hose nozzle with a valve therein that is automatic for partially restricting liquid flow therethrough when a container is almost full and that eliminates the separate valve body and cost of the nozzle and valve assemblies heretofore used; to provide such a nozzle and valve on the discharge end of a hose which is connected to the outlet of a manually operated pump which is operative to move liquid through the hose and nozzle; to provide such a nozzle and valve operative to partially interrupt flow through the pump and hose to indicate to an operator of the pump that the container receiving the liquid is almost full to thereby prevent overflow; and to provide such a nozzle and valve which is economical to manufacture, easily maintained, positive in operation and particularly well adapted for the proposed use.

Other objects and advantages of this invention will become apparent from the following description taken in connection with the accompanying drawings wherein are set forth by way of illustration and example, certain embodiments of this invention.

The drawings constitute a part of this specification and include an exemplary embodiment illustrating various objects and features of the nozzle and valve which incorporate features of the present invention.

FIG. 1 is a perspective view of a pump and a hose connected thereto and having a nozzle and valve embodying features of the present invention at the hose discharge.

FIG. 2 is an enlarged longitudinal section view showing the nozzle and valve in position for flow of fluid into a container.

FIG. 3 is an enlarged longitudinal sectional view showing the nozzle and valve in a flow interrupting or restricting position.

FIG. 4 is an enlarged end elevational view of the discharge end of the nozzle and valve.

FIG. 5 is an enlarged fragmentary sectional view taken on line 5—5, FIG. 4 and showing a valve member in an open flow permitting position.

FIG. 6 is an enlarged fragmentary sectional view showing mounting of one end of a pin for hingedly supporting a valve member.

Referring more in detail to the drawings:

As required, detailed embodiments of the invention ae disclosed herein, however, it is to be understood that the disclosed embodiments are merely exemplary of the invention. Therefore, specific structural and functional details disclosed herein are not to be interpreted as limiting but merely as a basis for the claims actually defining the scope of this invention.

In the disclosed embodiment of the present invention, the reference numeral 1 generally designates a nozzle and valve structure on the discharge end of a hose 2 having the other end 3 connected to a pump 4 operative to selectively move liquid from a drum or tank 5 through the hose and nozzle 1. The nozzle and valve structure 1 includes a tubular body 6 having an inlet end portion 7 adapted to be secured to the hose 2. In the illustrated structure, the inlet portion 7 has a threaded bore 8 screwed onto a threaded hose connection member 9. The nozzle body 6 has a side wall portion 10 defining a portion of a flow passage 11 tapering from the bore 8 to a dam 12 and a side wall portion 13 extending from the dam 12 to a discharge end 14 defining a portion of the flow passage 11 larger than the portion defined by the side wall portion 10. The side wall portion 13, dam 12, and discharge end 14 define a valve chamber 15. The dam 12 has an upper surface or crest 16 extending transversely across the flow passage 11 with the dam 12 reducing the flow area by from one-third to one-half of the upstream flow area.

In the illustrated embodiment, the flow passage 11 through the tubular body 6 is generally circular in transverse cross-section and the portion of the flow passage 11 defined by the side wall portion 10 and between the threaded bore 8 of the fluid inlet 7 and the dam 12 tapers toward the dam 12 and the portion of the body 6 defined by the wall portion 13 and between the dam 12 and the discharge end 14 is generally cylindrical and has a substantially uniform cross-section. A valve member 17, as later described, is mounted in the valve chamber 15 and is movable between a flow permitting position, as shown in FIG. 2, and a flow interrupting or restricting position, as shown in FIG. 3.

The valve member 17 is illustrated as a generally planar member having one edge portion thereof hingedly mounted within the valve chamber 15 and positioned adjacent the discharge end 14 and the dam 12. The planar valve member 17 has peripheral edge portions engageable with abutment means 18, as later described, within the valve chamber 15 when in the flow permitting position and engageable with the valve stop means 19, as later described, adjacent the discharge end 14 when in the flow interrupting position. When the valve member 17 is in the flow permitting position and in engagement with the abutment means 18, the valve member 17 is positioned below the upper surface or crest 16 of the dam 12 and the valve member 17 has an intermediate portion 20 extending outwardly from one surface thereof to be engaged by liquid flowing over the dam 12 when the valve member 17 is in engagement with the abutment means 18 and in the flow permitting position.

It is desirable to maintain the valve member 17 in the flow permitting position except when liquid in a container being filled rises over the discharge end 14 of the nozzle and valve structure 1, therefore, suitable resilient means, such as a spring 21, is provided for urging the valve member 17 toward the abutment means 18 and the flow permitting position. The illustrated spring 21 has convolutions wound to form a tubular portion for receiving a mounting pin 22 and portions engaging and operatively connected to the valve member 17 and the wall portion 13 defining the discharge end portion of the flow passage 11. In the illustrated embodiment, the valve member 17 has a pair of depending ears 23 and 24 having suitable aligned apertures therethrough for receiving the mountinG pin 22 to thereby hingedly mount the valve member 17.

The abutment means 18 are positioned below the upper surface or crest 16 of the dam 12 to thereby permit the valve member 17 to be below the upper surface or crest 16 of the dam 12 when in the flow permitting position. The illustrated abutment means 18 is a shoulder having an end portion adjacent and extending parallel with the dam 12 and having side portions extending inwardly from an interior surface of the wall portion 13 and extending substantially normal to each end of the dam 12 and extending from the dam 12 and toward the discharge end 14 thereby defining a substantially U-shaped support for peripheral edge portions of the planar valve member 17.

The valve stop means 19 are positioned within the valve chamber 15 and adjacent the discharge end 14 and are positioned to be engaged by the valve member 17 when in the flow interrupting position. The valve stop means 19 are illustrated as a plurality of circumferentially spaced projections formed in an upset edge 25 adjacent the discharge end 14 and positioned to be engaged by peripheral edge portions of the planar valve member 17.

Forming the nozzle and valve stucture 1 of the present invention includes die casting the tubular body 6 as one elongated integral tubular member having the inlet end portion 7 and the valve chamber 15 with the dam 12 positioned therebetween and reducing the flow passage 11 through the body member. A pair of transversely aligned recesses are cast in the side wall portion 13 defining the valve chamber respective and discharge end portion of the body member for receiving respective opposite ends of the mounting pin 22. The valve member 17 and and the spring 21 are positioned to receive the mounting pin 22 which is inserted through the aligned apertures in the depending ears 23 and 24 of the valve member 17 and through a tubular portion of the spring 21 to thereby hingedly and resiliently mount the valve member 17 within the valve chamber 15 or discharge end portion of the body member 6 when the mounting pin 22 has the ends thereof received in the rpspective recesses cast in the side wall portion 13. When the mounting pin 22 is positioned in the recesses one portion defining same is formed or staked to secure the pin 22 in position in the tubular body 6. The valve stop means 19 or seat members are formed in the discharge end 14 of the tublar body 6 and positioned to be engaged by the valve member 17 when in the flow restricting or interrupting position. The valve stop means 19 are formed by being pressed into the upset edge 25 to move a portion thereof inwardly of the interior surface of the wall portion 13.

In using the nozzle and valve structure 1, constructed as illustrated and described, the spring 21 maintains the valve member 17 in the flow permitting position and operation of the pump 4 moves a selected liquid through the hose or flow member 2 and into the inlet end portion 7 and through the tubular body 6. The liquid flows through the tapering portion of the flow passage 11 and over the upper surface or crest 16 of the dam 12 and into engagement with the intermediate portion 20 extending outwardly from one surface of the valve member 17 and outwardly through the discharge end 14 and into a suitable container 26. As liquid in the container 26 rises up and over the discharge end 14 of the nozzle and valve structure 1 thereby creating an equalizing pressure on the lower side of nozzle and valve structure 1 and in the valve chamber 15 which causes the valve member 17 to move out of engagement with the abutment means 18 and the valve member 17 moves above the upper surface or crest 16 of the dam 12 whereby additional liquid flowing through the flow passage 11 moves the valve member 17 into engagement with the valve stop means 19 and liquid pressure overcomes the operation of the spring 21 to maintain the valve member 17 in the flow restricting or interrupting position. The flow interrupting or restricting position causes a restriction to the flow of liquid which is felt on the handle of the pump 4 by an operator thereof which suggests that the container 26 is almost full and about to overflow.

It is to be understood that while I have illustrated and described one form of my invention, it is not to be limited to the specific form or arrangement of parts herein described and shown.

What I claim and desire to secure by Letters Patent is:

1. A flow nozzle comprising:
  a. a wall defining an elongated tubular body member having a flow passage extending therethrough and having an inlet end portion and a discharge end an upper surface extending transversely across the flow passage wherein:
    1. said inlet end portion and said discharge end portion and said dam are integral with said wall defining said body member;
    2. said dam reduces the flow area by between one-third and one-half of the upstream flow area;
    3. said inlet end portion of said tubular body member has a generally circular transverse cross-section and tapers from an inlet toward said dam;
    4. said discharge end portion of said tubular body member has a generally circular transverse cross-section and a substantially uniform cross-section between said dam and a discharge end; and
    5. said inlet end portion has a larger area than an area of said discharge end portion;
  b. meanS at the inlet end portion for connecting a flow member to said body member to communicate fluid into said inlet end portion of said body member;
  c. a valve member within the discharge end portion;
  d. means mounted on the wall defining the discharge end portion for hingedly mounting said valve member therein and movable between an open flow permitting position and a flow restricting position;
  e. means within the discharge end portion and engaginG said valve member for urging same toward the open flow permitting position; and
  f. a plurality of circumferentially spaced projections extending from said tubular body member and into said discharge end portion and positioned adjacent the discharge end, said projections being positioned to be engaged by said valve member to position same in the flow restricting position, said projections beinG integral with said discharge end portion.

2. A flow nozzle as set forth in claim 1 including:

a. shoulder within said discharge end portion and below the upper surface of said dam, said shoulder having an end portion adjacent and extending parallel with said dam and side portions each extending from a respective end of the end portion of said shoulder and toward the discharge end of said tubular body member thereby being positioned to be engaged by said valve member to position same in the flow permitting position, said shoulder being integral with said dam and said discharge end portion; and b. an intermediate portion extending outwardly from one surface of said valve member to be engaged by liquid flowing over said dam when said valve member is positioned in the flow permitting position.

3. A flow nozzle as set forth in claim 1 wherein:

a. said valve member is a generally planar member having a peripheral edge portion engageable with abutment means when in the flow permitting position and engageable with valve stop means in the form of said projections when in the flow restricting position;

b. said abutment means are positioned within said discharge end of said tubular body member and below the upper surface of said dam;

c. said abutment means comprises a shoulder within said discharge end portion and below the upper surface of said dam and having an end portion adjacent and extending parallel with said dam and side portions each extending from a respective end of the end portion of said shoulder and toward the discharge end of said tubular body member thereby beiuG positioned to be engaged by peripheral edge portions of said valve member to position same in the flow permitting position;

d. said shoulder is integral with said dam and said discharge end portion; and e. said valve member has an intermediate portion extending outwardly from one surface thereof to be engaged by liquid flowing over said dam when the peripheral edge portions of said valve member are in engagement with said shoulder.

* * * * *